United States Patent [19]

Merrick et al.

[11] 4,154,546
[45] May 15, 1979

[54] PIN AND SOCKET JOINT

[75] Inventors: Neville L. Merrick, Harbury; Thomas J. Owen, Leamington Spa, both of England

[73] Assignee: Automotive Products Limited, Warwickshire, England

[21] Appl. No.: 914,864

[22] Filed: Jun. 12, 1978

[30] Foreign Application Priority Data

Jun. 21, 1977 [GB] United Kingdom ............... 25795/77

[51] Int. Cl.² ............................................. F16C 11/06
[52] U.S. Cl. .................................. 403/134; 403/288; 277/212 FB
[58] Field of Search ............... 403/134, 288, 138, 135, 403/140, 139; 277/212 FB

[56] References Cited

U.S. PATENT DOCUMENTS

| 2,559,857 | 7/1951 | Edwards | 403/134 |
| 3,403,932 | 10/1968 | Kutcher | 277/212 FB X |
| 3,650,552 | 3/1972 | Schmid | 403/140 |

FOREIGN PATENT DOCUMENTS

| 1000622 | 8/1965 | United Kingdom | 403/134 |
| 1196088 | 6/1970 | United Kingdom | 403/138 |
| 1477649 | 6/1977 | United Kingdom | 403/134 |

Primary Examiner—Andrew V. Kundrat
Attorney, Agent, or Firm—Kemon & Estabrook

[57] ABSTRACT

The invention relates to pin and socket joints for use in the steering and suspension systems of automobiles. The head of the pin is housed in a socket having an aperture through which the pin extends, the aperture being sealed by an annular boot having peripheral portions sealing against the pin and socket respectively.

One of the peripheral portions is engaged in a groove in the pin or socket and the said one peripheral portion has interior passageways leading from the interior of the boot to the base of the groove and exterior passageways leading from the base of the groove to the exterior of the boot.

These passageways facilitate the rapid escape of grease from the boot during excessive power filling of grease into the joint so that the boot is not disengaged from the groove.

4 Claims, 3 Drawing Figures

PIN AND SOCKET JOINT

The invention relates to pin and socket joints in which a pin is mounted in a socket member so as to be movable therein in both rotation and tilting or in rotation or tilting only and a gaiter of flexible material (commonly called a boot) seals an aperture in the socket member through which the pin extends. Such joints are commonly used in the suspension and steering linkages of motor vehicles and the boot has the dual functions of retaining grease lubricant within the joint and preventing contamination from road dirt and water.

Although pin and socket joints of this kind are greased on assembly, it is often thought desirable to add more grease on fitting to the vehicle or to replenish the grease at intervals during the service life of the joint, a grease nipple being provided for the purpose. This can cause problems if too much grease is injected or if the grease is injected too fast because the boot is liable to jump out of a groove where it engages the socket or the pin or can even burst under pressure.

One method of overcoming this problem is disclosed in our British patent specification No. 1,477,649, in which a periphery of the boot engaging with a groove in either the socket housing or the pin, has circumferentially spaced passageways formed in the periphery of the boot which provide a communication from the interior of the boot to the base of the groove in which the boot engages.

Although the prior provision of passageways leading to the base of the groove will allow some escape of excess grease during filling, it will not meet the requirements for high pressure power filling and it is found that boots can be forced out of engagement with the groove in the socket or pin.

To meet the problem of high pressure power filling the present invention provides for grease to bypass, under pressure, and escape from the seating of the boot periphery at the base of the groove, at a rate not substantially less than the rate at which grease can enter the groove. This solution of the problem can in practice be simply put into effect by providing passageways leading from the base of the groove to the exterior of the boot, the total cross-sectional area of flow of the passageways leading to the exterior of the boot being such that excess grease can flow readily out of the groove at a rate which prevents the boot from being forced out of the groove in which it engages.

According to this invention there is provided a pin and socket joint having an annular boot sealing an aperture in the socket through which the pin extends, and having peripheral portions sealing against the pin and the socket respectively, one of the said peripheral portions engaging in a groove in a respective one of the pin and socket, has interior passageways leading from the interior of the boot to the base of the groove and exterior passageways leading from the base of the groove to the exterior of the boot.

The passageways allow air and excess grease to escape by the temporary lifting of the bootaway from the base of the groove when excess grease is injected into the joint.

Preferably the total cross-sectional area of flow of the exterior passageway is not less than half of the total cross-sectional area of flow of the interior passageway.

Conveniently each interior passageway comprises a notch which extends between that portion of the boot which engages a respective side wall of the groove and that portion of the boot which seals against the base of the groove, and it is preferably for each notch to be of rectangular cross-section, and a triangular longitudinal section.

Conveniently each exterior passageway comprises a rectangular cross-sectional channel adjacent a respective side wall of the groove and extending between the base of the groove and the exterior of the boot.

Conveniently the passageways are arranged such that the interior and exterior passageways are aligned with each other and there is a continuous land of boot between the said passageways which seals against the base of the groove.

An embodiment of the invention will now be described with reference to the accompanying drawings in which.

Figure 1:
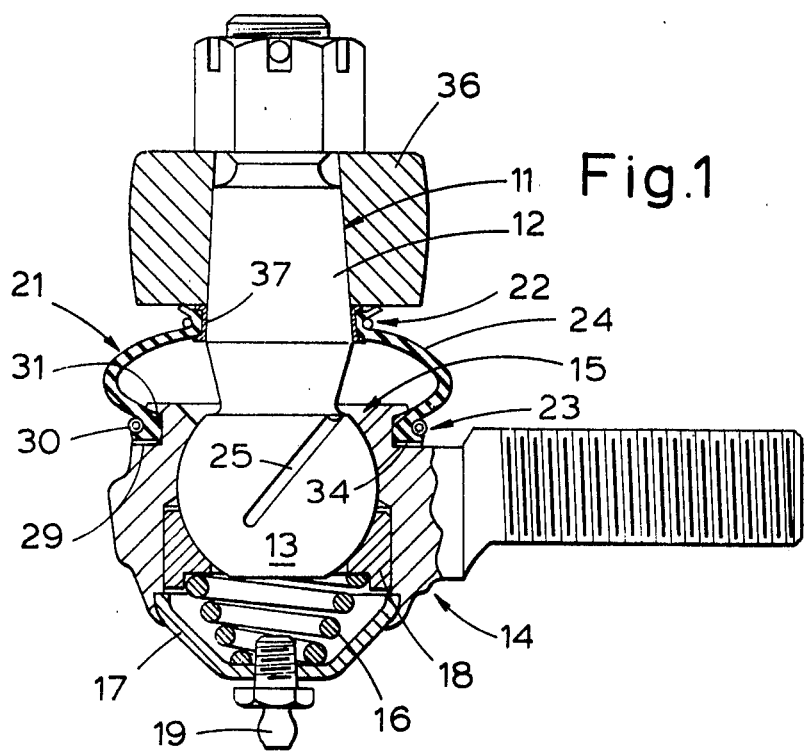
FIG. 1 is a pin and socket joint according to this invention.
Figure 2:
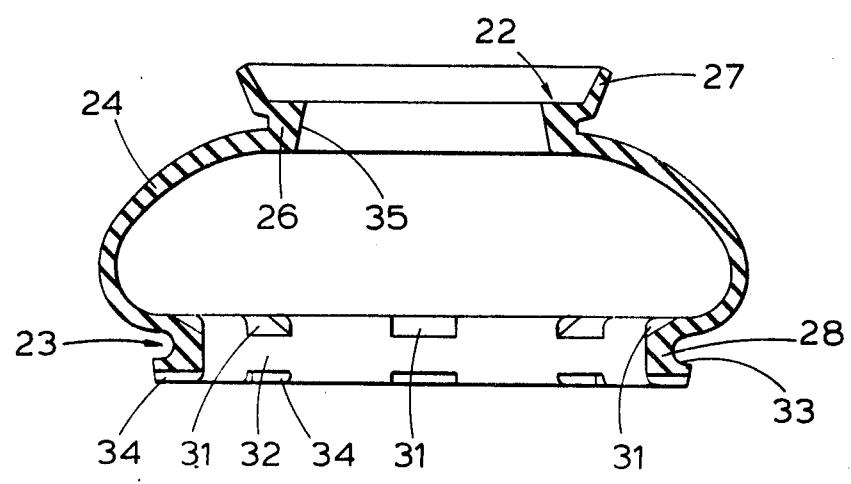
FIG. 2 is a sectional view of the boot utilised in FIG. 1.

With reference to FIG. 1 and FIG. 2 of the accompanying drawings a ball pin 11 comprises a shank 12 and head 13. The head 13 of the ball pin is housed in a socket member 14. The shank 12 of the ball pin projects through an aperture 15 in the socket member, the aperture 15 being of such size that the head 13 of the ball pin cannot pass through it.

The internal surface of the socket adjacent the mouth of the aperture 15 is hemi-spherical and co-operates with a like spherical surface on the head of the ball pin.

The ball pin is biassed against the internal surface of the socket by a spring 16 acting between a socket end plate 17 and a bottom bearing 18. The bearing 18 also has a hemi-spherical surface which co-operates with the spherical head 13 of the ball pin.

A grease nipple 19 is screwed into the socket end plate 17 so as to facilitate the introduction of grease into the ball joint during servicing of the vehicle. The grease can pass through the joint and is also spread over the contact areas between the head 13 and the bearing surfaces by virtue of a groove 25 in the head of the ball pin.

In use the ball pin rotates and tilts by virtue of its spherical surface co-operating with the like surfaces on the socket member and bottom bearing. The limitation on movement being the abutment of the shank 12 with the edge of the aperture 15.

The aperture 15 is sealed by a flexible rubber boot 21 of an annular configuration. The boot 21 has a radially inner peripheral portion 22 and a radially outer peripheral portion 23, the radially inner portion sealing against the shank 12 of the pin and the radially outer portion sealing against the external surface of the socket member 14. The walls 24 of the boot 21 are flexible and allow the side walls of the boot to accomodate relative movement of the pin as it tilts and/or rotates.

The radially inner peripheral portion 22 has a beaded rim 26 having a radially inner tapered surface 35 which seals against the shank 12 of the ball pin, and is held in position on the ball pin by a support ring 37, also tapered, which fits onto the shank 12 to prevent collapse of the boot. The beaded rim 26 also has a radially outer flap 27 which will abut the component 36 into which the pin 11 is secured.

The radially outer periphery 23 also carries a beaded rim 28 which engages in a rectangular circumferential groove 29 in the external surface of the socket housing. The boot 21 is held in position in the groove 29 by a spring ring 30 located in a circumferential external groove 33 in the beaded rim.

The beaded rim 28 has a plurality of circumferentially spaced interior passageways, constituted by the notches 31 which, when the beaded rim 28 is located in the rectangular groove 29 provide passageways from the interior of the boot to the base of the groove 29. The beaded rim 28 also carries a plurality exterior passageways constituted by channels 34 adjacent the respective side of the groove and extending from the base of the groove 29 to the exterior of the boot. Those notches 31 which provide a passageway from the interior of the boot to the base of the groove are aligned with those channels which provide a passageway from the base of the groove 29 to the exterior of the boot, and there is a continuous circumferential land 32 between two sets of aligned passageways. This land 32 provides continuous seal with the base of the groove 29.

Each notch 31 is rectangular in cross-section and varies in depth such that relative to the base of the groove each notch is of a greater depth at its interior end than at its end adjacent the bottom of the groove i.e. each notch 31 has a triangular longitudinal section, one side of the triangle being provided by base of the notch.

Each channel 34 is of rectangular cross-section and is designed such that the total cross-sectional area of the channels 34 is not less than half the total cross-sectional area of the notches 31 and is preferably equal to the said area of the notches. However the balance between the interior and exterior cross-sectional areas will depend upon the rate grease escape required.

In use when excess grease, or a too rapid injection of grease causes a pressure build up within the boot, the excess grease, or air which the grease may be replacing, can escape from within the boot. The grease can pass from the interior of the boot to the base of the groove 29 via the notches 31. The pressure build up within the boot, and the weakening of the bead 28 in those areas adjacent the notches 31 and channels 34, causes the bead to expand radially outwards thus allowing grease to pass over the lands 32, and exit via the aligned channels 34 to the exterior of the boot 21.

Figure 3:
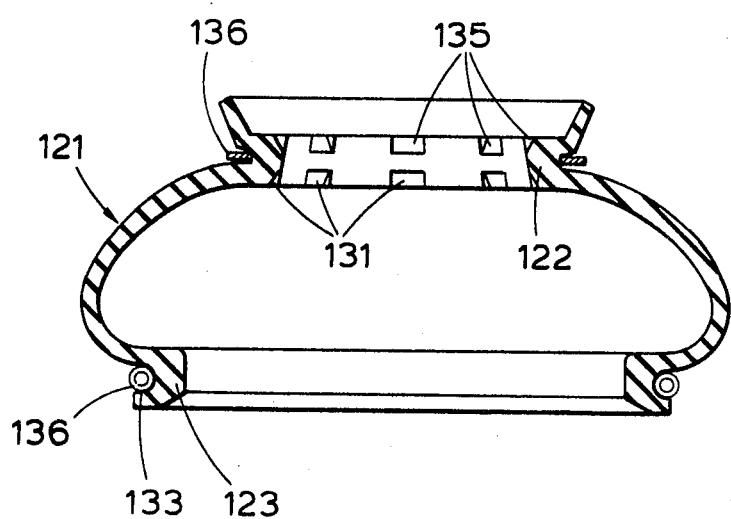
FIG. 3 is an alternative boot for a ball joint according to this invention.

FIG. 3 shows an alternative boot 121 in which the passageways for the grease are on the radially inner bead rim 122 which seals against the shank of the ball pin. The notches 131 which provide the interior passageways are as previously described and the exterior passageways 135 are also provided by similar notches instead of by rectangular channels. The radially outer beaded rim 123 is accommodated in a groove in the socket housing as previously described and has a groove 133 in the beaded rim for a spring ring which retains the beaded rim 123 in position.

The radially inner beaded rim 122 is accommodated in a groove provided on the shank of the ball pin.

We claim:

1. A pin and socket joint including
a pin having a head thereon;
a socket in which the head of the pin is housed and defining an aperture through which the pin extends;
an annular boot sealing said aperture and having peripheral portions sealing against the pin and socket respectively; and
an annular groove, in one of the socket and pin, having sides and a base, and in which one respective peripheral portion of the boot engages; wherein a said one respective peripheral portion has a plurality of interior passageways leading from the interior of the boot to the base of the groove, a plurality of exterior passageways leading from the base of the groove to the exterior of the boot, and a circumferentially continuous land providing sealing contact between the boot and the base of the groove to isolate the interior passageways from the exterior passageways under normal working conditions.

2. A pin and socket joint as claimed in claim 1, wherein the total cross-sectional area of the exterior passageways is not less than half the total cross-section area of the interior passageways.

3. A pin and socket joint as claimed in claim 1, wherein each exterior passageway comprises a notch which extends between that peripheral portion of the boot engaging a respective side wall of the groove and that portion of the boot which seals against the base of the groove.

4. A pin and socket joint as claimed in claim 3, wherein each exterior passageway is a rectangular cross-section channel adjacent a respective side wall of the groove and extending between the base of the groove and the exterior of the boot.

* * * * *